M. C. LEVINE.
AUTOMATIC CRANK RELEASING MECHANISM.
APPLICATION FILED MAR. 31, 1914.
1,128,012.
Patented Feb. 9, 1915.
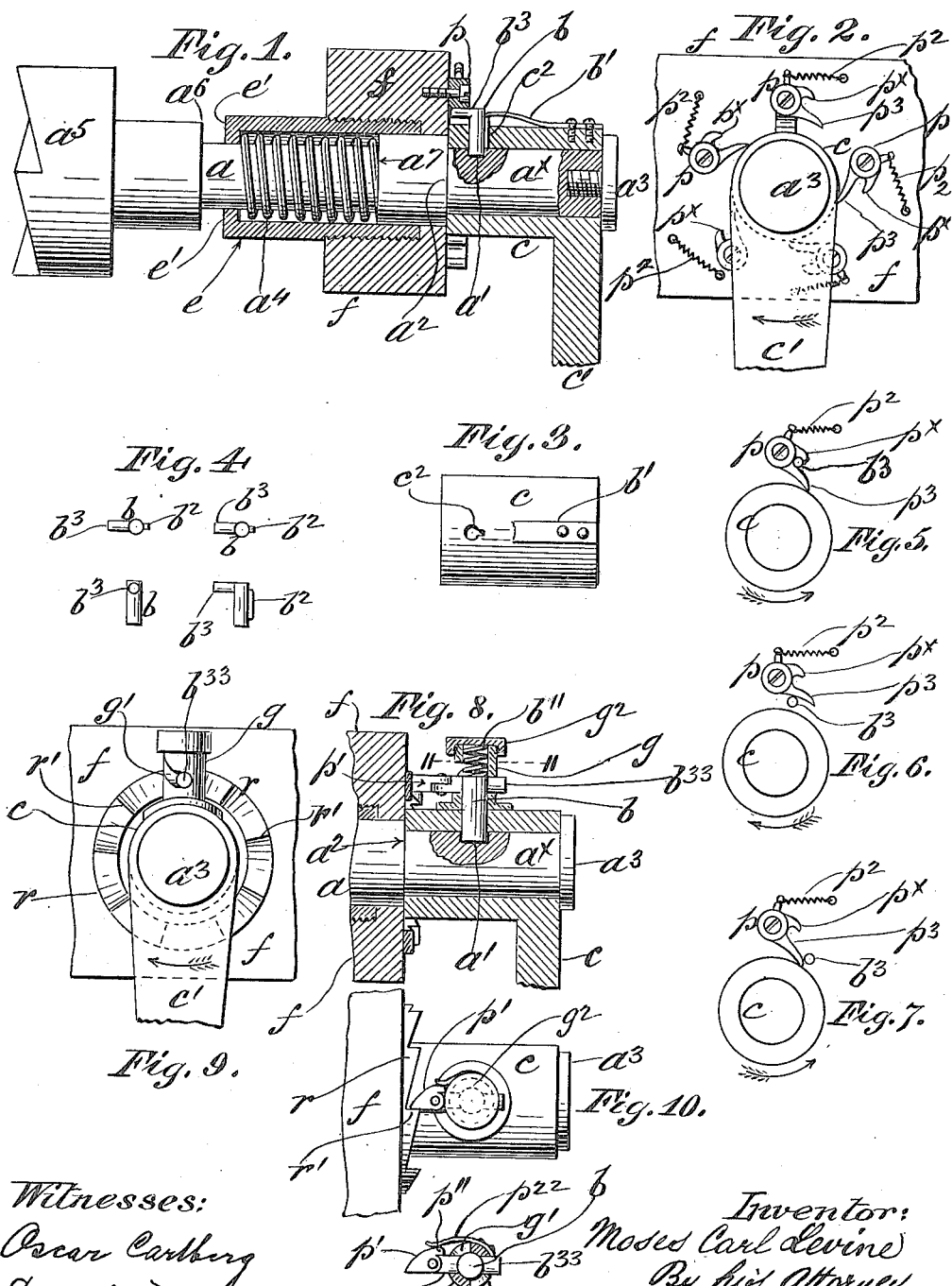
Witnesses:
Oscar Carlberg
Dorothy Miatt
Inventor:
Moses Carl Levine
By his Attorney
Leo. Wm. Miatt

UNITED STATES PATENT OFFICE.

MOSES CARL LEVINE, OF NEW YORK, N. Y.

AUTOMATIC CRANK-RELEASING MECHANISM.

1,128,012.  Specification of Letters Patent.  Patented Feb. 9, 1915.

Application filed March 31, 1914. Serial No. 828,429.

*To all whom it may concern:*

Be it known that I, MOSES CARL LEVINE, a citizen of the United States, and a resident of the borough of Bronx, in the city, county, and State of New York, have invented certain new and useful Improvements in Automatic Crank-Releasing Mechanism, of which the following is a specification.

While my improvements are applicable generally to hand cranks used in conjunction with apparatus in which there is possible danger of reversal of motion or powerful back pressure, the invention is designed more particularly for use in conjunction with auto-power shafts and the hand cranks with which many are provided as a means whereby the usual hydro-carbon motors provided for propulsion may be started in operation,—the object being to obviate all danger to the cranker in the event of premature sparking, explosion, and back pressure, a well known source of danger and inconvenience prevalent in connection with the use of a majority of automobiles at the present time.

The invention consists essentially in so coupling the hand crank to the slidable retractile clutch shaft provided for engagement with the motor crank shaft that the reversal of the latter when connected with the clutch shaft will immediately release the hand crank from the clutch shaft in such manner that the crank will be held stationary while allowing the clutch shaft to rotate freely with the power shaft until retracted therefrom automatically by the spring provided for said purpose. In other words the crank can be rotated only in one, the prescribed, direction, and upon reversal is, practically, immediately released from the clutch shaft, thus protecting the crank operator against all possibility of danger or injury from back action.

In the accompanying drawings, Figure 1, is a sectional elevation of a retractable clutch shaft and adjacent parts illustrating the practical application of my invention; Fig. 2, is a front elevation of the parts shown in Fig. 1; Fig. 3, a top view of the hand crank socket; Fig. 4, details of the crank bolt; Figs. 5, 6, and 7, diagrammatic views illustrating the operation of the bolt releasing means shown in Figs. 1, and 2; Fig. 8, is a sectional elevation of a modification of the crank bolt releasing means; Fig. 9, a front view of the parts shown in Fig. 8; Fig. 10, a top view thereof; Fig. 11, a detail view of the top of the bolt, &c., shown in Fig. 8.

The distinctive feature of my invention being the connection of the crank socket or head $c$, to the retractile clutch shaft $a$, by means of a bolt $b$, which is automatically withdrawn from its socket $a'$, in the clutch shaft $a$, when the motion of said clutch shaft is reversed in direction from that prescribed for the "cranking" of the motor, it is obvious that well known mechanical expedients may be resorted to giving practical effect to the principle involved, so that I do not confine myself to the specific construction and arrangement of parts herein shown and described. Thus in the first seven figures of the drawings I show the use of a series of spring-actuated pawls $p$, for effecting the release of the crank bolt $b$, when the motion of the crank arm $c'$, is reversed; while in the modification shown in the remaining figures a single spring pawl $p'$, is mounted directly on the bolt $b$, itself, and acts in conjunction with ratchet teeth $r$, concentric to the clutch shaft $c$, the result being the same in either case in that the reversal of motion raises the bolt $b$, out of engagement with the socket $a'$, in the clutch shaft $a$.

It is to be understood that as herein shown the parts are arranged for the usual "cranking" motion from left to right, as indicated by the direction of the arrows. Thus in the first seven figures the pawls $p$, $p$, are pivotally supported upon the front face of the fixed part $f$, with their ends pointing in the direction of the "cranking" motion and resting normally upon the peripheral surface of the crank socket $c$, which is cylindrical. Springs $p^2$, $p^2$, tend constantly to maintain them in this position with relation to the crank socket $c$, which is confined longitudinally upon the forward extension $a^x$, of the clutch shaft $a$, by and between the annular shoulder $a^2$, and the end cap screw $a^3$, as shown particularly in Figs. 1, and 8, of the drawings. This forward extension $a^x$, of the clutch shaft $a$, is cylindrical, and when not held by the bolt $b$, the crank socket $c$, is free to rotate thereon. Normally the inner end of the bolt $b$, is held in the mortise $a'$, by a flat metallic spring $b'$, attached to the crank socket $c$, and bearing against the bolt $b$, as shown in Fig. 1,—the said bolt $b$, being positioned in the bearing recess $c^2$, formed for the reception of the bolt in the crank socket $c$, a spline $c^2$, preventing the turning of the bolt $b$, on its longitudinal axis so that the lateral arm $b^3$, of said bolt is held constantly in alinement with the longitudinal axis of the clutch shaft $a$.

It is to be understood that in the drawings the clutch shaft $c$, for convenience of illustration is shown as thrust and held back by hand against the resistance of the spring $a^4$, so as to bring its clutch head $a^5$, into engagement with the opposed clutch part (not shown) on the motor shaft or other shaft with which connection is made temporarily,—the spring $a^4$, releasing the clutch head $a^5$, and returning the clutch shaft $a$, to its normal position when this inward pressure exerted upon the crank arm $c'$, is released. In this said normal position of the crank shaft $a$, its shoulder $a^6$, rests against the inner end $e'$, of the spring sleeve $e$, secured to the fixed part $f$,—the spring $a^4$, being interposed between said end $e'$, of the sleeve $e$, and the shoulder $a^7$, upon the clutch shaft as shown in Fig. 1; or any other mechanical expedient being resorted to that will effect a like result.

The clutch shaft $a$, being pressed back or inward as above set forth through the medium of the crank arm $c$, and crank socket $c$, to effect connection with the clutch device or object to be turned, say particularly the crank shaft of an auto-motor of the usual hydro-carbon type, the rotation of the crank arm $c'$, in the direction of the arrow, Fig. 2, 6, or 9, carries the arm $b^3$, of the bolt $b$, successively under each of the pawls $p$, raising them as it passes against the resistance of the springs $p^2$, which latter return the pawls $p$, to their normal positions (as soon as the bolt arm $b^3$, has passed) with their tongues $p^3$, resting against the periphery of the crank socket $c$, as shown in Figs. 2, 5, and 7, and this action will continue so long as the crank arm $c'$, and clutch shaft are rotated in the right direction. But suppose the direction of rotation to be reversed for any reason, as by defective or ill-timed sparking resulting in the premature ignition, explosion, and back pressure of the charge of hydro-carbon in an auto-motor in a manner well known, and a frequent cause of danger and injury to the operator of the crank,—under these conditions the reverse motion of the clutch crank $c$, will carry the arm $b^3$, of the bolt $b$, into contact with outer surface of the tongue $p^3$, of the pawl $p$, under which it has last passed, as shown in Fig. 7, and as a result the said arm $p^3$, acting as a cam, will carry the arm $b^3$, outward until it encounters the stop $p^x$, on the pawl $p$, this motion being sufficient to raise the bolt $b$, out of the bolt mortise or recess $a'$, in the forward extension $a^x$, of the clutch shaft $a$, thereby releasing the crank socket $c$, and arm $c'$, from said clutch shaft $a$, and allowing the latter to rotate freely in the reversed direction until the hand pressure on the crank is released, when the spring $a^4$, will disengage the clutch mechanism and return the clutch shaft $a$, to its normal forward position with its shoulder $a^6$, resting against the rear end $e'$, of the spring sleeve $e$, as heretofore set forth. The spring $b'$, will again return the bolt $b$, to engagement with the recess $a'$, in the forward extension $a^x$, of the clutch shaft $a$, when said bolt and recess are brought into coincidence, thereby re-locking the crank to the clutch shaft. The stops $p^x$, on the pawls $p$, sustain the bolt $b$, in the retracted position until released by a partial turn of the crank in the right direction sufficient to bring the bolt and its socket $a'$, into coincidence as before stated. A like result is attained by the modification shown in the last four figures of the drawings, in which the upper portion of the bolt $b$, is surrounded by a sleeve $g$, formed with inclined cam surfaces $g'$, upon which the lateral arms $b^3$, $b^{33}$, of the bolt $b$, rest, being held thereto by the coiled spring $b''$, confined in the sleeve $g$, by the cap $g^2$, as shown particularly in Fig. 8. The spring pawl $p'$, is pivotally mounted on the bolt arm $b^3$, and is formed with a shoulder $p''$, held normally in contact with said bolt arm $b^3$, by the flat metal spring $p^{22}$, secured to the exterior of the sleeve $g$, as shown particularly in Fig. 11. When the clutch arm is pushed back manually into the position shown in Figs. 1, and 8, the pawl $p'$, is brought into position for engagement with the ratchet teeth $r$, arranged on the fixed part $f$, or other suitable support, concentrically with relation to the longitudinal axis of the clutch shaft $a$. So long as the crank arm $c'$, is rotated in the right direction (in the direction of the arrow, Fig. 9) the pawl $p'$, clicks over the included surfaces of the ratchet teeth, but upon the reversal of motion the pawl $p'$, will encounter the shoulder $r'$, of the ratchet tooth last past and by reason of the shoulder $p''$, upon said pawl, will carry the arms $b^3$, $b^{33}$, up the inclines $g'$, $g'$, of the sleeve against the resistance of the spring $b''$, thereby releasing the bolt $b$, from the mortise $a'$, in the forward extension $a^x$, of the clutch shaft $a$, and holding the bolt in this withdrawn position until by the release of hand pressure on the crank arm $c'$, the spring $a^4$, as heretofore stated, returns the clutch shaft $a$, to its normal forward position,—the crank and clutch shaft being again locked together by bringing the recess $a'$, and bolt $b$, again into coincidence.

It will be noted that in either arrangement of crank-releasing means the retraction of the bolt is effected almost instantly upon the reversal of motion, much less than a quarter back turn of the clutch shaft being sufficient to free it from the crank, so that while the extent of motion is sufficient to give ample time for the operation of the release it is insufficient to allow the clutch shaft to acquire a dangerous degree of momentum before effecting the desired result. As a result of this avoidance of excessive strain the parts are safeguarded against fracture or injury; while the extent and momentum of reverse motion is too slight to injure the crank operator. Furthermore, the action of the release mechanism is entirely automatic, and does not affect nor disarrange the other operative parts, neither is it dependent thereon in any way except that it is actuated by a reversal of the motor or other shaft which the clutch shaft $a$, is arranged to serve.

Hence what I claim as my invention and desire to secure by Letters Patent is,

Automatic crank-releasing mechanism of the character designated, comprising a slidable retractile clutch shaft formed with a bolt mortise, a hand crank loosely mounted on said clutch shaft and having a socket member, a spring actuated bolt mounted in the socket member of said hand crank and adapted to engage the said bolt mortise in the clutch shaft, and trip mechanism mounted on a fixed part and arranged to engage said bolt and release it from the mortise in the clutch shaft when the motion of the latter is reversed.

MOSES CARL LEVINE.

Witnesses:
 GEO. WM. MIATT,
 DOROTHY MIATT.

Copies of this patent may be obtained for five cents each, by addressing the "Commissioner of Patents, Washington, D. C."